United States Patent [19]

Alexander

[11] 4,450,502
[45] May 22, 1984

[54] MULTILAYER CERAMIC DIELECTRIC CAPACITORS

[75] Inventor: John H. Alexander, Hertfordshire, England

[73] Assignee: ITT Industries, Inc., New York, N.Y.

[21] Appl. No.: 470,760

[22] Filed: Feb. 28, 1983

[30] Foreign Application Priority Data

Mar. 30, 1982 [GB] United Kingdom ................. 8209283

[51] Int. Cl.³ ...................... H01G 1/14; H01G 4/10; H01G 7/00
[52] U.S. Cl. .................................... 361/309; 361/321; 29/25.42
[58] Field of Search ............... 29/25.42; 361/304–308, 361/311–313, 321, 309

[56] References Cited

U.S. PATENT DOCUMENTS

| | | | |
|---|---|---|---|
| 3,179,545 | 4/1965 | Bowers | 29/25.42 X |
| 3,310,718 | 3/1967 | Lupfer | 361/321 X |
| 3,604,082 | 9/1971 | McBrayer et al. | 361/321 X |
| 3,612,963 | 10/1971 | Piper et al. | 361/321 |
| 3,679,950 | 7/1972 | Rutt | 361/321 |
| 3,755,723 | 8/1973 | Short | 361/321 |

FOREIGN PATENT DOCUMENTS 936442  9/1963  United Kingdom ............... 29/25.42

OTHER PUBLICATIONS

I.E.E.E., vol. PHP-13, No. 3, 361-306, Sep. 1977, pp. 279-282.
Transactions on Parts, Hybrids, and Packaging.

Primary Examiner—Donald A. Griffin
Attorney, Agent, or Firm—John T. O'Halloran; Peter R. Ruzek; Mary C. Werner

[57] ABSTRACT

Conductive and porous end terminations for metal-impregnated multilayer ceramic dielectric capacitors are provided by firing a silver, or silver alloy, and glass frit onto respective end regions of a sintered capacitor stack. The exposed silver of the fired terminations is provided with a silver sulphide layer, the latter being a good electrical conductor and acting as a barrier between the silver and the impregnation metal, for example lead, during a subsequent impregnation step, whereby to prevent leaching of the silver. The termination is readily solderable by virtue of the silver sulphide layer being wetted by the lead during the impregnation step and resulting in a lead coating in the termination.

11 Claims, 1 Drawing Figure

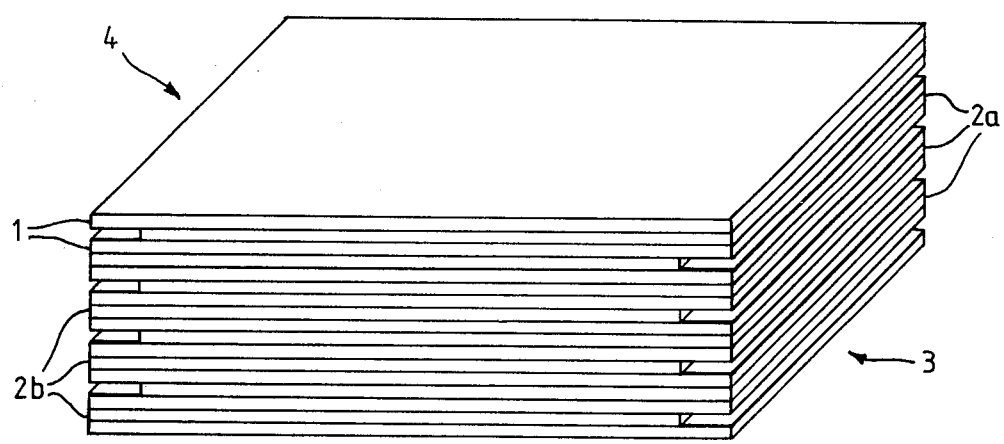

MULTILAYER CERAMIC DIELECTRIC CAPACITORS

SUMMARY OF THE INVENTION

This invention relates to electrical components such as multilayer ceramic dielectric capacitors and in particular, but not exclusively, to metal-impregnated electrode multilayer ceramic dielectric capacitors.

According to one aspect of the present invention there is provided a method of manufacturing an electrical component comprising providing an insulating substrate, forming a connection termination on the substrate by firing a frit containing glass and silver or silver alloy thereon, forming an electrode of the electrical component in contact with the termination, and forming a silver sulphide layer on the exposed silver of the termination.

According to a further aspect of the present invention there is provided a method of manufacturing a multilayer ceramic dielectric capacitor including the steps of applying a frit containing glass and silver or silver alloy to end faces of the capacitor to which electrodes of the capacitor extend, firing the frit to provide silver containing end terminations, and providing the exposed silver of the end terminations with a silver sulphide layer.

BRIEF DESCRIPTION OF THE DRAWING

Embodiments of the present invention will now be described with reference to the accompanying drawing which shows a perspective schematic view of a basic multilayer ceramic dielectric capacitor structure.

DETAILED DESCRIPTION OF THE PREFERRED EMBODIMENT

The basic capacitor comprises a stack of ceramic dielectric layers 1 with electrodes 2a and 2b therebetween. Alternate electrodes 2a terminate at the right hand face 3 and do not extend completely to the left hand face 4, whereas alternate electrodes 2b extend to the left hand face 4, but do not reach the right hand face 3. Thus the electrodes 2b can be electrically interconnected at the end face 4 (end terminated) and the electrodes 2a can be likewise electrically interconnected at the end face 3, to form two electrically insulated sets of electrodes 2a and 2b. In order to facilitate preparation of the drawing, which is only schematic, the electrode sets are shown as extending to the lateral sides of the stack. However, in practice neither set of electrodes extend to the lateral sides, which in the finished device are all ceramic. Instead of the internal electrodes 2a and 2b being rectangular and stepped sideways in successive layers as shown, they may alternatively, for example, have elongate portions which cross one another, as described in British Application No. 41677/78 (Ser. No. 2032689) of A. L. Oliver and G. Mills, or instead of being rectangular the electrodes may be comprised of pluralities of parallel conductive lines, as described in British Application No. 8204777 of J. H. Alexander.

The manufacture of multilayer ceramic dielectric capacitors with the basic structure shown in the drawing comprises the following steps. Green (unfired) ceramic sheets of barium titanate, for example, are prepared in a conventional manner, for example tape casting, tape drawing or printing. In order to manufacture capacitors in quantity a screen-printing technique is employed to print a large number of electrodes side by side on one relatively large sheet of green ceramic, although alternatively a single electrode may be provided on a suitably sized sheet of green ceramic. The electrodes may be printed by means of a conductive ink or, in the case of metal-impregnated electrodes the printed electrodes on the green ceramic comprise fugitive electrodes printed by means of a fugitive electrode ink comprising a charcoal powder with a binder and solvent such as to make it compatible with the green ceramic. Further sheets are similarly printed. A number of such sheets, the number corresponding to the number of electrodes in each capacitor, are stacked one on top of the other with the electrodes staggered and partially overlying one another as illustrated in the drawing. A blank green ceramic sheet is applied to the top of the stack. Extra blank green ceramic sheets may be applied to the top and bottom of the stack in order to protect the outer electrodes and to give adequate strength to the finished device. The block of stacked green ceramic sheets thus formed is cut to make individual green capacitor elements. The electrodes do not extend up to the lateral cut faces as previously mentioned.

Subsequently the capacitors are fired. In the case of fugitive electrode devices the green capacitor elements are heated at, for example, 1° C./min to 350° C., to bake out the binders in the fugitive ink and the green ceramic, before firing at, for example, 200° C./hour to 1120° C. for 2 hours in a conventional manner, during which firing the charcoal of the fugitive ink burns, providing spaces between the dielectric layers comprised by the fired ceramic sheets which become sealed together during the firing process.

The fired capacitor elements are then end terminated at faces 3 and 4 in order to connect the alternate electrodes 2a and 2b of the drawing, or in the case of fugitive electrodes, to connect the alternate spaces between the dielectric layers. After firing, the electrodes 2a, or spaces corresponding thereto, are exposed at end face 3, whereas only the electrodes 2b, or spaces corresponding thereto, are exposed at end face 4, the illustrated gaps at the end faces 3 and 4 provided by the staggered overlying arrangement of the electrodes being closed by ceramic of the dielectric layers 1 during the manufacturing process. Likewise the lateral faces are closed by ceramic. Thus end terminations applied to end faces 3 and 4 can only connect a respective one set of electrodes or spaces.

The end terminations of multilayer ceramic capacitors, in particular fugitive electrode (lead-impregnated) capacitors, may be formed from silver and this may be achieved by applying a silver and glass frit which is fired onto the end faces in air at some temperature above 700° C. The actual temperature depends on the softening temperature of the glass frit and whether or not there was any palladium or platinum loading of the silver to reduce leaching at a subsequent soldering stage. In the case of fugitive electrode devices the terminated capacitor elements are subsequently metal impregnated, for example lead impregnated, in a vessel which permits the air in the spaces between the dielectric layer to be pumped out before the elements are immersed in molten metal, for example in lead at 370°–400° C. The lead is forced into the spaces by the application of a nitrogen pressure of approximately 40 psi for 20 minutes in the case of porous end terminations. The impregnation period is generally at least 10 minutes and the pressure is less than 60 psi. For lead impregnated capacitors it is necessary to employ materials for the end terminations which are porous to, but not readily soluble in, lead at the lead impregnation temperatures employed. The end terminations are of a porous nature whereby to facilitate the lead impregnation between the dielectric layers to form the internal electrodes proper. Impregnation is carried out only via the porous end terminations. With such end terminations, the impregnated capacitor element is a saleable item; however, alternatively, external connection wires may be soldered to the end terminated faces of the element and the capacitor encapsulated in, for example, resin.

A major problem with lead impregnated capacitors concerns the provision of readily solderable end terminations, and if silver/glass frit terminations are used, even those which include platinum or palladium, the silver rapidly dissolves in the lead during impregnation and a non-terminated capacitor element results. While we have successfully used aluminum and aluminum/silver terminations in an attempt to solve the dissolution problem, as is described for example in co-pending U.S. Application Ser. No. 404,745, filed Aug. 3, 1982 of J. H. Alexander, these terminations are not always readily solderable and require further treatment to render them so.

We have now found that silver/glass frit terminations can be treated such as to overcome the dissolution problem and the solderability problem in one step. This is accomplished by lightly sulphiding the silver of terminations which are provided on a capacitor stack by firing a silver/glass frit thereon at a temperature up to 800° C. The silver sulphide $Ag_2S$ thus formed is a good electrical conductor and acts as a physical barrier between the silver of the termination and the lead employed in the impregnation process. In addition, the lead wets the silver sulphide, thus ensuring that a layer of lead remains as a coating on the outer part of the termination. It is, therefore, extremely easy to solder to the silver terminations by virtue of the presence of the lead layer, and good electrical contact between wires soldered to the terminations through to the internal lead electrodes is thus achieved.

The Silver sulphide may be formed, for example, by exposing the silver to hydrogen sulphide or sulphur vapor at a temperature of 350° to 400° C. It is important to ensure that all silver surfaces that will come into contact with the lead are coated with silver sulphide. This may be accomplished by putting silver-end-terminated capacitor elements in a chamber, evacuating the chamber, heating the elements to 350° to 400° C. and admitting hydrogen sulphide or sulphur vapor into the chamber. The vapor then fills all open voids and cavities in the end terminations, the silver sulphide forming on contact of the vapor with silver. Other sulphiding agents may comprise organic materials such as $CH_3SH$, $C_2H_5SH$, for example.

The silver/glass frit end terminations need not employ pure silver; the sulphiding process is equally applicable to end terminations formed from glass frits and alloys of silver, such as zinc, tin, nickel or copper, which are less expensive than pure silver. Thus there may be provided leach-resistant readily solderable silver or silver alloy based end terminations for metal-impregnated multilayer ceramic capacitors. The sulphiding process may also be employed in connection with silver or silver-alloy based contacts provided on other types of ceramic capacitors or on other electrical components, such as on film circuits.

While I have described above the principles of my invention in connection with specific apparatus, it is to be clearly understood that this description is made only by way of example and not as a limitation to the scope of my invention as set forth in the accompanying claims.

I claim:

1. A method of manufacturing an electrical component comprising the steps of:
    forming a connection termination on the ends of an insulating substrate by applying and firing a frit to the ends of the substrate, the frit containing glass and a conductor selected from the group consisting of silver and silver alloy;
    forming a silver sulphide layer on the termination; and
    forming an electrode that extends to the ends of the substrate to contact the connection termination.

2. A method of manufacturing a multilayer ceramic capacitor comprising the steps of:
    forming a plurality of layers of a ceramic substrate;
    forming electrodes on intermediate layers of the substrate that extend to the ends of the layers;
    providing porous conductive end terminations on the ends of the layers; and
    forming a sulphide layer on the end terminations.

3. The method as claimed in claim 2, wherein formation of the electrodes comprises the steps of:
    applying a fugitive electrode ink to the substrate layers;
    heating and firing the fugitive electrode to provide spaces in between the layers; and
    impregnating the layers with a metal electrode material after the formation of the sulphide layers in order to form the electrode, the electrode connecting directly with the end terminations.

4. The method as claimed in claim 3 wherein the metal electrode material is lead and wherein during the impregnation step a lead layer is formed on the sulphide layer.

5. The method as claimed in claim 2 wherein formation of the porous end terminations comprises the steps of:
    applying a frit containing glass and a conductor selected from the group consisting of silver and silver alloy to the ends of the layers; and
    firing the frit.

6. The method as claimed in claim 5 wherein the frit is fired at a temperature up to 800° C.

7. The method as claimed in claim 5 wherein the sulphide layer is a silver sulphide layer and is formed by contacting the exposed silver of the end terminations with a sulphur selected from the group consisting of hydrogen sulphide and sulphur vapor.

8. The method as claimed in claim 5, further comprising the step of soldering connection wires to the end termination after the lead impregnation step.

9. The method as claimed in claim 2 further comprising, prior to forming the sulphide layer, the steps of:
    evacuating air from voids in the capacitors and the end terminations; and
    heating the capacitor to a temperature in the range of 350°–400° C.

10. In a method of manufacturing a multilayer ceramic capacitor wherein porous conductive end terminations are formed on the ends of a plurality of layers of a ceramic substrate and electrodes are formed which connect with the end terminations by impregnation of the layers with a metal electrode material, the improvement comprising the step of:

sulphiding the end terminations prior to impregnating the layers.

11. A multilayer ceramic dielectric capacitor comprising:

a plurality of ceramic dielectric layers;

electrodes located in between the layers and extending to the ends of the layers;

porous conductive end terminations located on the ends of the layers and connected to the electrodes; and a sulphide layer located on the end terminations.

* * * * *